United States Patent
Huang et al.

(10) Patent No.: US 10,991,076 B2
(45) Date of Patent: Apr. 27, 2021

(54) IMAGE SUPER-RESOLUTION METHOD, IMAGE SUPER-RESOLUTION DEVICE, AND COMPUTER READABLE STORAGE MEDIUM

(71) Applicant: SHENZHEN SKYWORTH-RGB ELECTRONIC CO., LTD., Guangdong (CN)

(72) Inventors: Zhe Huang, Guangdong (CN); Zhilin Xiao, Guangdong (CN)

(73) Assignee: SHENZHEN SKYWORTH-RGB ELECTRONIC CO., LTD., Shenzhen (CN)

(*) Notice: Subject to any disclaimer, the term of this patent is extended or adjusted under 35 U.S.C. 154(b) by 34 days.

(21) Appl. No.: 16/545,967

(22) Filed: Aug. 20, 2019

(65) Prior Publication Data

US 2019/0370938 A1 Dec. 5, 2019

Related U.S. Application Data

(63) Continuation of application No. PCT/CN2018/099071, filed on Aug. 7, 2018.

(30) Foreign Application Priority Data

Feb. 11, 2018 (CN) .......................... 201810147781.5

(51) Int. Cl.
*G06T 3/40* (2006.01)
*G06T 5/00* (2006.01)

(52) U.S. Cl.
CPC ............ *G06T 3/4076* (2013.01); *G06T 5/001* (2013.01); *G06T 2207/20081* (2013.01); *G06T 2207/20084* (2013.01)

(58) Field of Classification Search
CPC ......... G06T 3/4053; G06T 2207/20081; G06T 2207/20084; G06T 5/001
See application file for complete search history.

(56) References Cited

U.S. PATENT DOCUMENTS

| 2011/0128394 | A1 | 6/2011 | Narayanan et al. |
| 2019/0138838 | A1* | 5/2019 | Liu .......................... G06T 5/002 |
| 2020/0364556 | A1* | 11/2020 | Irani ..................... G06T 3/4053 |

FOREIGN PATENT DOCUMENTS

| CN | 107274347 A | 2/2018 |
| CN | 107657586 A | 2/2018 |
| CN | 108288251 A | 7/2018 |

OTHER PUBLICATIONS

International Search Report dated Nov. 5, 2018; PCT/CN2018/099071.

(Continued)

*Primary Examiner* — Ross Varndell

(57) ABSTRACT

Disclosed is an image super-resolution method, which includes: acquiring and amplifying an image to be processed, and extracting a scaling feature from the amplified image, to obtain a first image to be processed; sending the first image to be processed to a residual network, for the residual network outputting a corrected second image to be processed; and restoring the second image to be processed to generate a restored image, and outputting the restored image. The present disclosure further provides an image super-resolution device and a computer readable storage medium.

11 Claims, 4 Drawing Sheets

(56) References Cited

OTHER PUBLICATIONS

Yuchen Fan, et al.; "Balanced Two-Stage Residual Networks for Image Super-Resolution", 2017 IEEE Conference on Computer Vision and Pattern Recognition Workshops (CVPRW), IEEE, Jul. 21, 2017, pp. 1157-1164, XP033145896, DOI: 10.1109/CVPRW.2017.154.
Kaiming He, et al; "Deep Residual Learning for Image Recognition", Dec. 10, 2015 (Dec. 10, 2015), pp. 1-12, XP055717904, DOI: 10.1109/CVPR.2016.90, Retrieved from the Internet.
Kaiming He, et al; "Delving Deep into Rectifiers: Surpassing Human-Level Performance on ImageNet Classification", arXiv.org, Feb. 6, 2015, pp. 1-11, XP055694220, DOI: 10.1109/ICCV.2015.123, Retrieved from the Internet.
Yudong Liang, et al; "Single Image Super-resolution via a Lightweight Residual Convolutional Neural Network", Dec. 6, 2017; pp. 1-11, XP055767487, Retrieved from the Internet.
Bee Lim, et al; "Enhanced Deep Residual Networks for Single Image Super-Resolution", Arxiv.org, Cornell University Library, 201 Olin Library Cornell University Ithaca, NY 14853, Jul. 10, 2017, XP080775642, DOI: 10.1109/CVPRW.2017.151.
Tim Salimans, et al; "Weight Normalization: A Simple Reparamentation to Accelerate Training of Deep Neural Networks", Feb. 25, 2016, XP055540660, Retrieved from the Internet.
Supplementary European Search Report dated Feb. 21, 2018; Appln. No. 18905631.0.

\* cited by examiner

IMAGE SUPER-RESOLUTION METHOD, IMAGE SUPER-RESOLUTION DEVICE, AND COMPUTER READABLE STORAGE MEDIUM

CROSS REFERENCE TO RELATED APPLICATIONS

The present disclosure is a Continuation Application of PCT Application with No. PCT/CN2018/099071, filed on Aug. 7, 2018, which claims the priority of Chinese Patent Application with No. 201810147781.5, entitled "image super-resolution method, image super-resolution device, and computer readable storage medium", filed on Feb. 11, 2018, which is hereby incorporated by reference in its entirety.

TECHNICAL FIELD

The present disclosure relates to the technical field of image processing, and in particular, to an image super-resolution method, an image super-resolution device, and a computer readable storage medium.

BACKGROUND

Nowadays, high-resolution display screens has been widely used in home audio and video equipments and mobile devices, as people are of increasingly demanding of high-quality images or videos. High-quality images or videos help people to obtain more abundant and accurate information, and resolution is an important factor for judging the quality of images. However, in many cases, the resolution of the captured image is lower due to the limitation of the performances of external machines and the influences of shooting conditions, the blurred image cannot meet the requirements of practical application. Therefore, it is imperative to improve the image resolution. Although the most direct way to improve the image resolution is to improve the hardware configuration, the image resolution which is also called as super-resolution technology is usually improved through the software method, as improving the hardware configuration is costly and limited by the physical condition.

Super-resolution image reconstruction can generate high-quality and high-resolution images through a set of low-quality and low-resolution images or a motion sequence. With the development of artificial intelligence, technicians can get super-resolution single frame based on depth convolution neural network, making great progress in super-resolution technology of single frame.

At present, super-resolution image reconstruction has been widely used in real life, such as, high-definition television, medical images, satellite images, security detection, microscopic imaging, virtual reality, etc. As to the field of digital television, super-resolution image reconstruction which can convert digital television signals into high-definition television signals is an extremely important application, for effectively improving video clarity. Super-resolution image reconstruction follows the principle of "deeper network, better effect". However, due to the deepening of the network, technology adopting SRResNet network structure has defects such as too many parameters, slow gradient convergence, difficult training, a decrease in real-time rate, etc. The classical ResNet model uses batch normalization method to converge the gradient and speed up the training process. However, batch normalization may lead to excessive computational overhead with the deepening of the depth of the network, and the features may be standardized in the light of its principle. As such, batch normalization is not suitable for super-resolution applications. Therefore, it is necessary to propose a processing method different from batch normalization to reduce computational overhead and speed up the convergence rate. Additionally, the classic ResNet model does not mention how to realize super-resolution technology with different magnification rates. Since the magnification rate of the resolution in TV applications is fixed, the classic ResNet model cannot be well adapted to TV applications.

The contents above are only intended to assist in understanding the technical solution of the present disclosure, but not to represent the related art.

SUMMARY OF THE DISCLOSURE

It is therefore one main objective of the disclosure to provide an image super-resolution method, an image super-resolution device, and a computer readable storage medium, aiming to solve the problem that video images at different magnification rates cannot share training results of convolutional neural network In order to achieve the above objective, the present disclosure provides an image super-resolution method, which includes:

acquiring and amplifying an image to be processed, and extracting a scaling feature from the amplified image, to obtain a first image to be processed;

sending the first image to be processed to a residual network, for the residual network outputting a corrected second image to be processed; and restoring the second image to be processed to generate a restored image, and outputting the restored image.

Optionally, the operation of acquiring and amplifying an image to be processed, and extracting a scaling feature from the amplified image, to obtain a first image to be processed, includes:

acquiring a low-resolution image to be processed, and pre-processing the image to be processed in a pre-processing convolution layer; and sending the pre-processed image to be processed to a scale amplification module, amplifying the image to be processed based on a preset amplification scale, and extracting the scaling feature from the amplified image, to obtain the first image to be processed.

Optionally, the preset amplification scale is defined as two times, three times, or four times.

Optionally, the operation of sending the first image to be processed to a residual network, for the residual network outputting a corrected second image to be processed, includes:

sending the first image to be processed to the residual network, processing the first image to be processed by a plurality of bottleneck residual units in the residual network, to generate the corrected second image to be processed; and sending the second image to be processed to a scale restoring module.

Optionally, the residual network includes the plurality of bottleneck residual units and a convolution layer, and each bottleneck residual unit is connected with a weight normalization module.

Optionally, the bottleneck residual unit includes three convolution layers, and an activation function layer is defined between each two adjacent convolution layers, and the activation function is a PReLu function.

Optionally, the activation function includes a variable, and the value of the variable is obtained through learning from an upper network layer.

Optionally, the operation of restoring the second image to be processed to generate a restored image, and outputting the restored image, includes:

on condition that a scale restoring module receives the second image to be processed, reducing the scale of the second image to be processed based on a scale in a scale amplification module, to generate the restored image; and outputting the restored image.

Optionally, the operation of sending the first image to be processed to a residual network, for the residual network outputting a corrected second image to be processed, includes:

sending the first image to be processed to the residual network, processing the first image to be processed by a plurality of bottleneck residual units in the residual network, to generate the corrected second image to be processed; and sending the second image to be processed to a scale restoring module.

In addition, in order to achieve the above objective, the present disclosure further provides an image super-resolution device. The device includes: a memory, a processor, and an image super-resolution program stored on the memory and executable on the processor, the program, when executed by the processor, implements the following operations:

acquiring and amplifying an image to be processed, and extracting a scaling feature from the amplified image, to obtain a first image to be processed;

sending the first image to be processed to a residual network, for the residual network outputting a corrected second image to be processed; and restoring the second image to be processed to generate a restored image, and outputting the restored image.

Optionally, the program, when executed by the processor, implements the following operations:

acquiring a low-resolution image to be processed, and pre-processing the image to be processed in a pre-processing convolution layer; and sending the pre-processed image to be processed to a scale amplification module, amplifying the image to be processed based on a preset amplification scale, and extracting the scaling feature from the amplified image, to obtain the first image to be processed.

Optionally, the program, when executed by the processor, implements the following operations:

sending the first image to be processed to the residual network, processing the first image to be processed by a plurality of bottleneck residual units in the residual network, to generate the corrected second image to be processed; and sending the second image to be processed to a scale restoring module.

In addition, in order to achieve the above objective, the present disclosure further provides a computer readable storage medium, an image super-resolution program is stored on the computer readable storage medium, the program, when executed by the processor, implements the following operations:

acquiring and amplifying an image to be processed, and extracting a scaling feature from the amplified image, to obtain a first image to be processed;

sending the first image to be processed to a residual network, for the residual network outputting a corrected second image to be processed; and restoring the second image to be processed to generate a restored image, and outputting the restored image.

Optionally, the program, when executed by the processor, implements the following operations:

acquiring a low-resolution image to be processed, and pre-processing the image to be processed in a pre-processing convolution layer; and sending the pre-processed image to be processed to a scale amplification module, amplifying the image to be processed based on a preset amplification scale, and extracting the scaling feature from the amplified image, to obtain the first image to be processed.

Optionally, the program, when executed by the processor, implements the following operations:

sending the first image to be processed to the residual network, processing the first image to be processed by a plurality of bottleneck residual units in the residual network, to generate the corrected second image to be processed; and sending the second image to be processed to a scale restoring module.

In the technical solution of the present disclosure, the image to be processed is acquired and amplified, and the scaling feature is extracted from the amplified image, to obtain the first image to be processed; the first image to be processed is sent to the residual network, for the residual network outputting the corrected second image to be processed; and the second image to be processed is restored to generate the restored image, and the restored image is output. The present disclosure could pre-process the image by amplifying the image to different magnifications. The module part relying on magnification rates can be separated from the main network, and most of the parameters independent of the magnification rates can share the network training results at different magnification rates, for increasing the versatility. The technical solutions can be meet the super-resolution requirement of 8K TV (the total column quantity of video pixels is 4320).

The realization of the aim, functional characteristics, advantages of the present disclosure are further described specifically with reference to the accompanying drawings and embodiments.

DETAILED DESCRIPTION OF THE EMBODIMENTS

It is to be understood that, the exemplary embodiments of the present disclosure are configured for illustrating the present disclosure rather than restricting the present disclosure.

Figure 1:
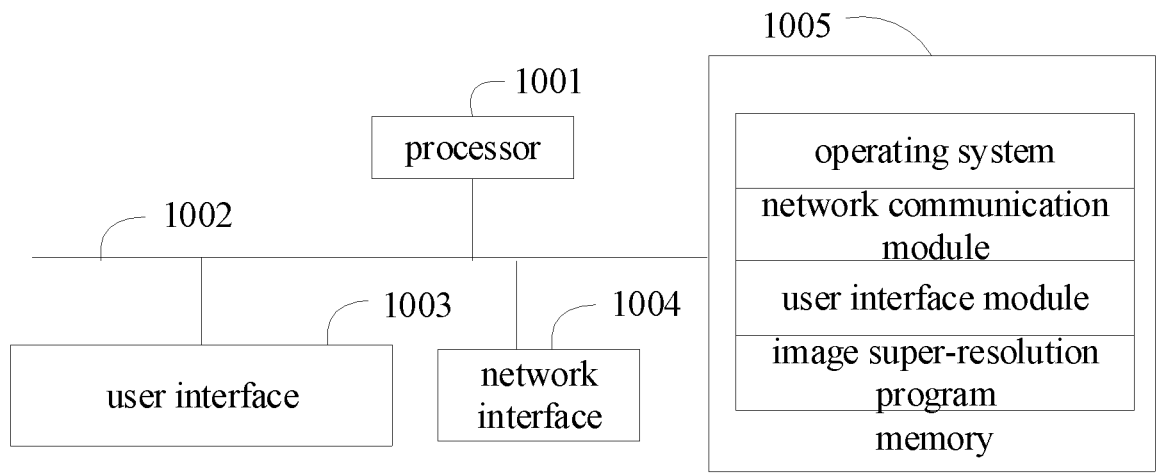
FIG. 1 is a schematic structural diagram of a terminal of an image super-resolution device in a hardware operating environment according to an embodiment of the present disclosure.

As shown in FIG. 1, FIG. 1 shows a schematic structural diagram of a terminal of an image super-resolution device in a hardware operating environment according to an embodiment of the present disclosure.

In the embodiment of the present disclosure, the terminal may be a PC, or a mobile terminal device with display function, such as a smart phone, a tablet computer, an e-book reader, a Moving Picture Experts Group Audio Layer III (MP3) player, a Moving Picture Experts Group Audio Layer IV (MP4) player, a portable computer, etc.

As shown in FIG. 1, the terminal may include a processor 1001, such as a CPU, a network interface 1004, a user interface 1003, a memory 1005, and a communication bus 1002. The communication bus 1002 is configured to realize the connections and communications among these components. The user interface 1003 may include a display, an input unit such as a Keyboard. Optionally, the user interface 1003 may also include a standard wired interface and a wireless interface. The network interface 1004 may optionally include a standard wired interface and a wireless interface (such as a WI-FI interface). The memory 1005 may be a high-speed RAM memory or a non-volatile memory such as a disk memory. The memory 1005 may alternatively be a storage device independent of the aforementioned processor 1001.

Optionally, the terminal may further include a camera, a Radio Frequency (RF) circuitry, a sensor, an audio circuitry, a WiFi module, etc. The sensor can be at least one selected from a group consisting of light sensor, motion sensor, etc. Specifically, the light sensor may include an ambient light sensor and a proximity sensor, and the ambient light sensor may adjust brightness of the display screen according to brightness of ambient light, and the proximity sensor may turn off the display screen and/or backlight when the mobile terminal moves to the ear. The gravity acceleration sensor, as a kind of motion sensor, can detect the magnitude of acceleration in all directions (generally including x axis, y axis, z axis), and can detect the magnitude and direction of gravity when the mobile terminal is still. So that, the gravity acceleration sensor can be applied to applications for identifying attitude of mobile terminal (such as switching between horizontal orientation and vertical orientation, related games, magnetometer attitude calibration), and can be also applied to functions related to vibration identification (such as pedometer, tapping), etc. Of course, the mobile terminal can also be equipped with gyroscope, barometer, hygrometer, thermometer, infrared sensor, and the like, there is no need to repeat here.

Those skilled in the art can understand that the structure shown in FIG. 1 does not constitute a limitation on the terminal, and the terminal may include more or fewer components than shown, or a combination of some of the components, or different component arrangements.

As shown in FIG. 1, the memory 1005 which is regarded as a computer storage medium may include an operating system, a network communication module, a user interface module, and an image super-resolution program.

In the terminal as shown in FIG. 1, the network interface 1004 is mainly configured to connect with a background server, and perform data communication with the background server. The user interface 1003 is mainly configured to connect with the client (a user end), and perform data communication with the client. While the processor 1001 may be configured to call an image super-resolution program stored on the memory 1005.

In this embodiment, the image super-resolution device includes a memory 1005, a processor 1001, and an image super-resolution program stored on the memory 1005 and executable on the processor 1001. The program, when executed by the processor 1001, performs the following operations:

acquiring and amplifying an image to be processed, and extracting a scaling feature from the amplified image, to obtain a first image to be processed;

sending the first image to be processed to a residual network, for the residual network outputting a corrected second image to be processed; and restoring the second image to be processed to generate a restored image, and outputting the restored image.

The program, when executed by the processor, further implements the following operations:

acquiring a low-resolution image to be processed, and pre-processing the image to be processed in a pre-processing convolution layer; and sending the pre-processed image to be processed to a scale amplification module, amplifying the image to be processed based on a preset amplification scale, and extracting the scaling feature from the amplified image, to obtain the first image to be processed.

The program, when executed by the processor, further implements the following operations:

sending the first image to be processed to the residual network, processing the first image to be processed by a plurality of bottleneck residual units in the residual network, to generate the corrected second image to be processed; and sending the second image to be processed to a scale restoring module.

Figure 2:
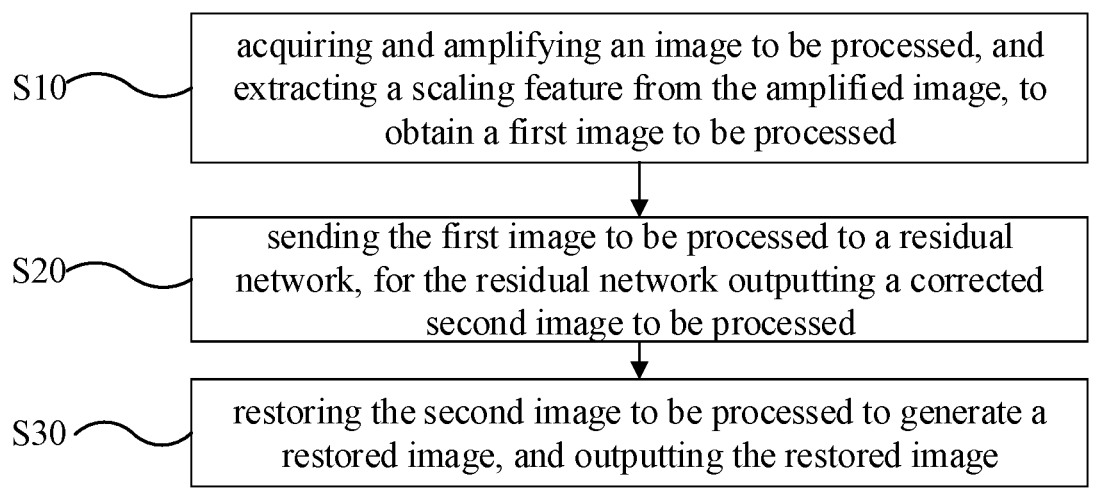
FIG. 2 is a flow chart of an image super-resolution method according to a first embodiment of the present disclosure.

The present disclosure provides an image super-resolution method according to a first embodiment. As shown in FIG. 2, FIG. 2 shows a flow chart of the image super-resolution method according to the first embodiment of the present disclosure;

S10, acquiring and amplifying an image to be processed, and extracting a scaling feature from the amplified image, to obtain a first image to be processed;

The method of the present disclosure can be applied to both the image field and the video field. In the method, single frame is acquired first. As to the video, the video can be decomposed into a sequence having continuous frames, and then the frames in the sequence are subjected to a super-resolution processing, and the processed frames are integrated into high-resolution video based on the processed high-resolution avatars.

Figure 3:
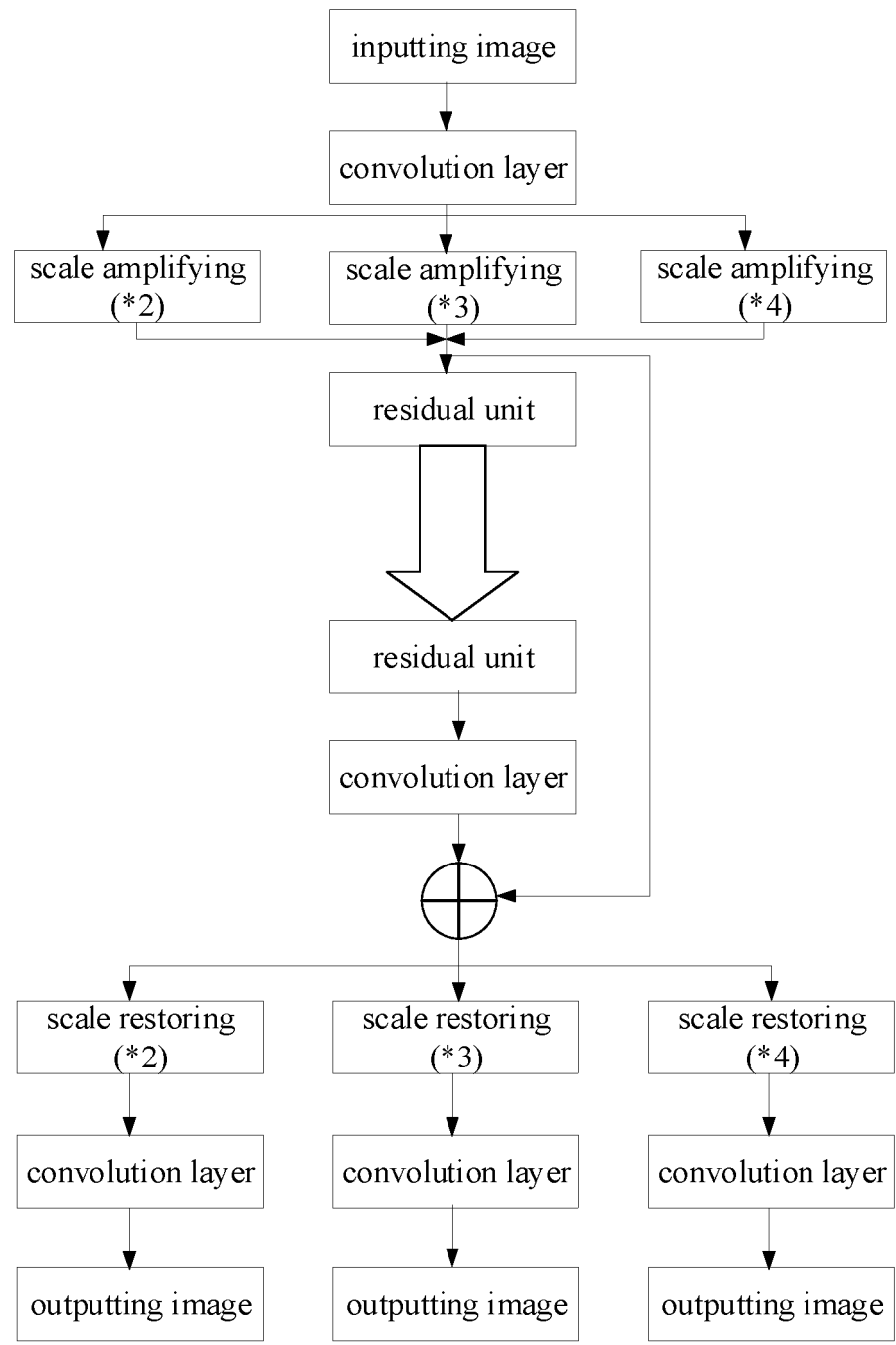
FIG. 3 is a main flow chart of the image super-resolution method according to the first embodiment of the present disclosure.

FIG. 3 shows the main flow chart of the method. When a low-resolution image to be processed is obtained, the image to be processed is input into the pre-processing convolution layer to extract feature from the image to be processed. After the feature extracting process, the image subjected to feature extracting process is sent to the scale amplification module. Three amplification scales are preset in the scale amplification module, namely two times, three times and four times respectively, so that different amplification scales can be selected according to actual conditions. Since the video resolution adopted by digital TV is fixed, such as 720P, 1080P, 2K, or 4K, etc. Under normal circumstances, different video resolutions are suitable for different amplification scales. When the amplification scale is two times, the scale of each pixel point in a single direction changes to two times of the original scale, that is, each pixel point changes to four pixel points. And the four pixel points are arranged in 2×2 array. That is, the scale of the amplified pixel point in any direction becomes two times of the original scale of the pixel point. Similarly, when the amplification scale is three times or four times, the scale of each pixel point changes to three times or four times of the original scale of the pixel point. For example, when the amplification scale is three times, one pixel point changes to nine pixel points; when the amplification scale is four times, one pixel point changes to sixteen pixel points.

After the scale of image to be processed is subjected to the amplification process by the scale amplification module, the scaling feature is extracted from the amplified image. Scaling feature represents the amplification times which indicates the amplification of image. Then, the first image to be processed is acquired after process of extracting scaling feature. The first image to be processed does not contain the scaling feature. That is, even the images are amplified based on different amplification scales, the first imaged to be processed, obtained through the process of extracting scaling feature, are the same.

after scaling feature extraction is the same.

Figure 4:
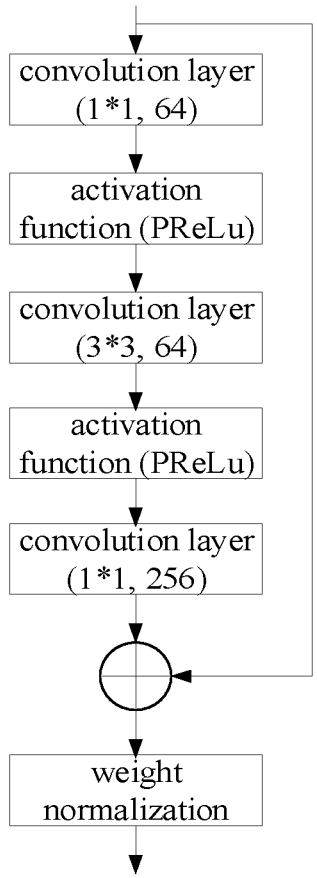
FIG. 4 is a schematic structural diagram of a bottleneck residual unit in the image super-resolution method according to the first embodiment of the present disclosure.

S20, sending the first image to be processed to a residual network, for the residual network outputting a corrected second image to be processed; and Actually, the residual network is a convolution neural network, the residual network includes several bottleneck residual units and convolution layers. A weight normalization module is set after each bottleneck residual unit. As shown in FIG. 4, each bottleneck residual unit includes three convolution layers and two activation function layers, and one activation function layer is located between two adjacent convolution layers. The activation function adopts the PReLu function and contains a variable, the variable is obtained from the network learning at the previous level. In addition, in this embodiment, ResNet-34 network model is adopted.

Before the emergence of residual network, depth network model adapted by user has a few layers. A series of measures, such as setting reasonable weight initialization, increasing batch standardization, and improving activation function, etc., were adopted to effectively alleviate the gradient disappearance, making depth network training feasible. With the deepening of network layers, the error becomes smaller theoretically, and the expression ability of the model is enhanced. However, the training error becomes larger after simply overlaying the network layers, which is mainly affected by factors such as gradient disappearance, etc. Thus, the residual network is emerged. The residual network is formed by stacking residual modules. The residual module includes a conventional residual module and a bottleneck residual module. The 1×1 convolution in the bottleneck residual module can play the role of lifting and lowering the dimension, thus enabling the 3×3 convolution can be performed on the lower input dimension. This design can greatly reduce the calculation amount, and can achieve a better effect in deep network. The activation function in the residual network is defined as PReLu, instead of ReLu, and a parameter is introduced to help the activation function to learn partial negative coefficient adaptively. In addition, the residual network adopts image up-sampling method and sub-pixel convolution layer.

S30, restoring the second image to be processed to generate a restored image, and outputting the restored image.

A scale restoring module is arranged behind the residual network, and the main function of the scale restoring module is to reductively restore the image to be processed which is amplified by the scale amplification module, for generating the high-resolution restored image, then the high-resolution restored image is output, for obtaining high-quality video.

In the technical solution of the present disclosure, the image to be processed is acquired and amplified, and the scaling feature is extracted from the amplified image, to obtain the first image to be processed; the first image to be processed is sent to the residual network, for the residual network outputting the corrected second image to be processed; and the second image to be processed is restored to generate the restored image, and the restored image is output. The present disclosure could pre-process the image by amplifying the image to different magnifications. The module part relying on magnification rates can be separated from the main network, and most of the parameters independent of the magnification rates can share the network training results at different magnification rates, for increasing the versatility. The technical solutions can be meet the super-resolution requirement of 8K TV (the total column quantity of video pixels is 4320).

Figure 5:
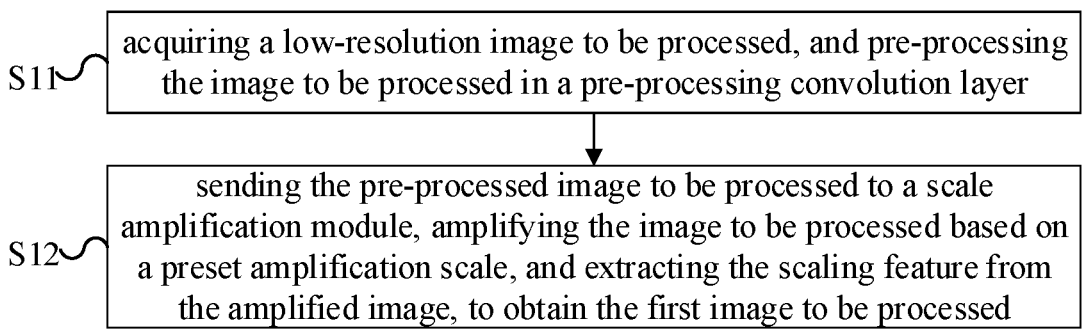
FIG. 5 is a detailed flow chart of the operations of acquiring and amplifying an image to be processed, and extracting a scaling feature from the amplified image, to obtain a first image to be processed, in an image super-resolution method according to a second embodiment of the present disclosure.

Based on the first embodiment, the present disclosure provides an image super-resolution method according to a second embodiment. Referring to FIG. 5, S10 includes:

S11, acquiring a low-resolution image to be processed, and pre-processing the image to be processed in a pre-processing convolution layer; and When the low-resolution image to be processed is acquired, the image to be processed is input into the pre-processing convolution layer to extract feature from the image to be processed. After the feature extracting process, the image subjected to feature extracting process is sent to the scale amplification module.

S12, sending the pre-processed image to be processed to a scale amplification module, amplifying the image to be processed based on a preset amplification scale, and extracting the scaling feature from the amplified image, to obtain the first image to be processed.

Three amplification scales are preset in the scale amplification module, namely two times, three times and four times respectively, so that different amplification scales can be selected according to actual conditions. Since the video resolution adopted by digital TV is fixed, such as 720P, 1080P, 2K, or 4K, etc. Under normal circumstances, different video resolutions are suitable for different amplification scales. After the scale of image to be processed is subjected to the amplification process by the scale amplification module, the scaling feature is extracted from the amplified image. Scaling feature represents the amplification times which indicates the amplification of image. Then, the first image to be processed is acquired after process of extracting scaling feature. The first image to be processed does not contain the scaling feature. That is, even the images are amplified based on different amplification scales, the first imaged to be processed, obtained through the process of extracting scaling feature, are the same.

Further, in one embodiment, the method further includes:

The preset amplification scale is defined as two times, three times, or four times.

When the amplification scale is defined as two times, the scale of each pixel point in a single direction changes to two times of the original scale, that is, each pixel point changes to four pixel points. And the four pixel points are arranged in 2×2 array. That is, the scale of the amplified pixel point in any direction becomes two times of the original scale of the pixel point. Similarly, when the amplification scale is three times or four times, the scale of each pixel point changes to three times or four times of the original scale of the pixel point. For example, when the amplification scale is three times, one pixel point changes to nine pixel points; when the amplification scale is four times, one pixel point changes to sixteen pixel points.

In the embodiment, the image super-resolution method obtains the low-resolution image to be processed, and pre-processes the image to be processed in the pre-processing convolution layer, then sends the pre-processed image to the scale amplification module for amplifying the pre-processed image based on the preset amplification scale, and extracts the scaling feature from the amplified image to obtain the first image to be processed which is subjected to scaling feature extracting process. The adjacent frames of the video images have strong correlation, not only the quality of reconstructed super-resolution images, but also the efficiency of reconstructing super-resolution images should be ensured.

Figure 6:
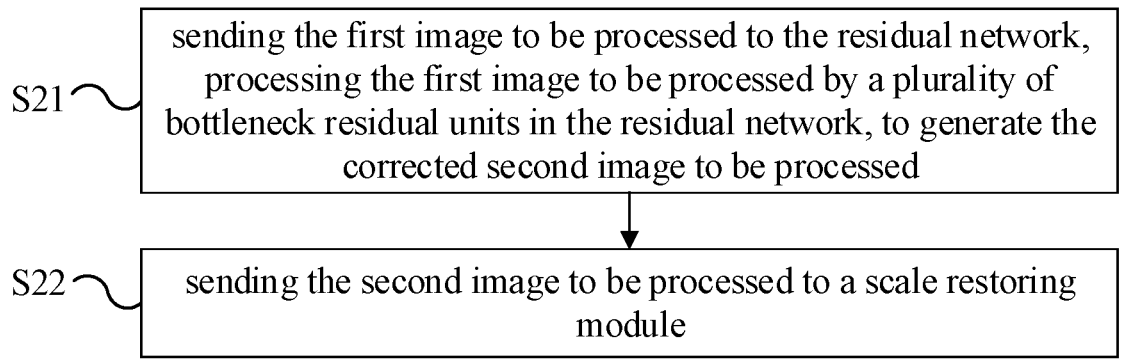
FIG. 6 is a detailed flow chart of the operation of sending the first image to be processed to a residual network, for the residual network outputting a corrected second image to be processed, in an image super-resolution method according to a third embodiment of the present disclosure.

Based on the first embodiment, the present disclosure provides an image super-resolution method according to a third embodiment. Referring to FIG. 6, S20 includes:

S21, sending the first image to be processed to the residual network, processing the first image to be processed by a plurality of bottleneck residual units in the residual network, to generate the corrected second image to be processed; and Before the emergence of residual network, depth network model adapted by user has a few layers. A series of measures, such as setting reasonable weight initialization, increasing batch standardization, and improving activation function, etc., were adopted to effectively alleviate the gradient disappearance, making depth network training feasible. With the deepening of network layers, the error becomes smaller theoretically, and the expression ability of the model is enhanced. However, the training error becomes larger after simply overlaying the network layers, which is mainly affected by factors such as gradient disappearance, etc. Thus, the residual network is emerged. The residual network is formed by stacking residual modules. The residual module includes a conventional residual module and a bottleneck residual module. The 1×1 convolution in the bottleneck residual module can play the role of lifting and lowering the dimension, thus enabling the 3×3 convolution can be performed on the lower input dimension. This design can greatly reduce the calculation amount, and can achieve a better effect in deep network. The activation function in the residual network is defined as PReLU, instead of ReLU, and a parameter is introduced to help the activation function to learn partial negative coefficient adaptively. In addition, the residual network adopts image up-sampling method and sub-pixel convolution layer.

Actually, the residual network is a convolution neural network, the residual network includes several bottleneck residual units and convolution layers. A weight normalization module is set after each bottleneck residual unit. As shown in FIG. 4, each bottleneck residual unit includes three convolution layers and two activation function layers, and one activation function layer is located between two adjacent convolution layers. The activation function adopts the PReLu function and contains a variable, the variable is obtained from the network learning at the previous level. In addition, in this embodiment, ResNet-34 network model is adopted.

S22, sending the second image to be processed to a scale restoring module.

The first image to be processed which does not have the scaling feature is input into the residual network, for processing the first image to be processed, then the the residual network outputs the corrected second image to the scale restoring module, the scale restoring module restores the image which does not have the scaling feature, for generating the restored image with scaling feature.

Furthermore, in one embodiment, the method further includes:

The residual network includes the plurality of bottleneck residual units and a convolution layer, and each bottleneck residual unit is connected with a weight normalization module.

As shown in FIG. 3, the residual network is arranged behind the scale amplification module and includes a plurality of bottleneck residual units. A convolution layer is arranged behind the bottleneck residual unit. A weight normalization module is arranged behind each bottleneck residual unit. The weight normalization processing is a method for parameterizing a neural network model. Since the parameter set includes a vast number of weights and deviation values in the depth neural network, how to optimize the above-mentioned parameters is an important problem in depth learning.

In the weight normalization module, in order to speed up the convergence speed of the optimization operation, the K-order weight vector is expressed by the K-order vector v and the scale factor g based on the random gradient descent. Through certain mathematical changes, the following formula is obtained:

$$w = \frac{g}{\|v\|}v, \|w\| = g$$

$$\nabla_g L = \frac{\nabla_w L \cdot v}{\|v\|}$$

$$\nabla_v L = \frac{g}{\|v\|}\nabla_w L - \frac{g\nabla_g L}{\|v\|^2}v$$

Where g is regarded as the scale factor, w is regarded as the k-order weight vector, v is regarded as the k-order vector, and L is regarded as the loss function.

Furthermore, in one embodiment, the method further includes:

The the bottleneck residual unit includes three convolution layers, and an activation function layer is defined between each two adjacent convolution layers, and the activation function is a PReLu function.

As shown in FIG. 4, each bottleneck residual unit includes three convolution layers, and an activation function layer is defined between each two adjacent convolution layers. The activation function is parametric ReLU, i.e., PReLU function. The formula for this function is as follows:

$$PReLu = \begin{cases} x, x \geq 0 \\ \alpha \cdot x, x < 0 \end{cases}$$

In which, α is a variable and learned from the upper layer of network. The variable α helps the function to learn some negative coefficients adaptively.

As to the image super-resolution method according to the embodiment, the first image to be processed is sent to the residual network, and then processed by the plurality of bottleneck residual units in the residual network, for generating corrected second image to be processed. Then the corrected second image is sent to the scale restoring module. Therefore, the activation function layer is improved, for improving the learning ability and adaptability of the residual network.

Figure 7:
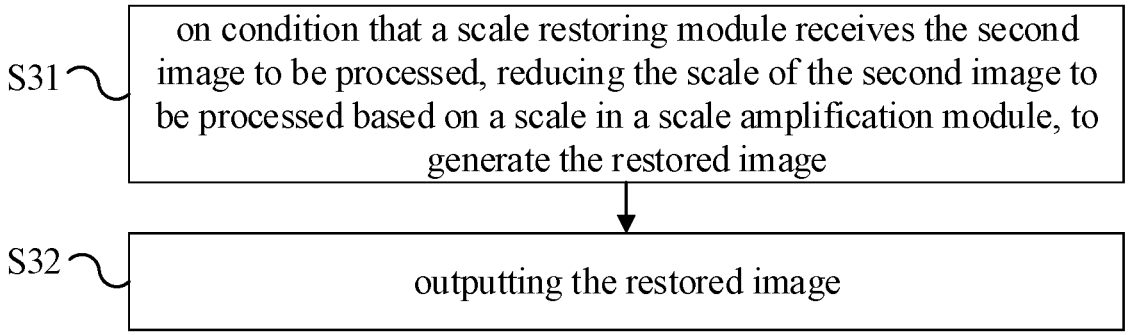
FIG. 7 is a detailed flow chart of the operations of restoring the second image to be processed to generate a restored image, and outputting the restored image, in an image super-resolution method according to a fourth embodiment of the present disclosure.

Based on the first embodiment, the present disclosure provides an image super-resolution method according to a fourth embodiment. Referring to FIG. 7, S30 includes:

S31, on condition that a scale restoring module receives the second image to be processed, reducing the scale of the second image to be processed based on a scale in a scale amplification module, to generate the restored image; and A scale restoring module is arranged behind the residual network, and the main function of the scale restoring module is to reductively restore the image to be processed which is amplified by the scale amplification module, for generating the high-resolution restored image, then the high-resolution restored image is output, for obtaining high-quality video.

S32, outputting the restored image.

As to the image super-resolution method in the embodiment, on condition that the scale restoring module receives the second image to be processed, the scale restoring module generates the restored image by correspondingly reducing the second image based on the scale in the scale amplification module. Then the stored image is output. The residual network adopts the weight normalization module for greatly reducing the calculation cost of weight normalization, avoids the add of randomness in the noise estimation process. Therefore, the residual network can be applied to more types of network models.

In addition, the present disclosure also provides a computer readable storage medium. The computer readable storage medium stores an image super-resolution program. The program, when executed by a processor, implements the following operations:

acquiring and amplifying an image to be processed, and extracting a scaling feature from the amplified image, to obtain a first image to be processed;

sending the first image to be processed to a residual network, for the residual network outputting a corrected second image to be processed; and restoring the second image to be processed to generate a restored image, and outputting the restored image.

The program, when executed by the processor, further implements the following operations:

acquiring a low-resolution image to be processed, and pre-processing the image to be processed in a pre-processing convolution layer; and sending the pre-processed image to be processed to a scale amplification module, amplifying the image to be processed based on a preset amplification scale, and extracting the scaling feature from the amplified image, to obtain the first image to be processed.

The program, when executed by the processor, implements the following operations:

sending the first image to be processed to the residual network, processing the first image to be processed by a plurality of bottleneck residual units in the residual network, to generate the corrected second image to be processed; and sending the second image to be processed to a scale restoring module.

It needs to be noted that in the present disclosure, the terms "comprising", "including" or other variants aim to cover non-exclusive inclusion, such that the processes, methods, articles or devices including a series of factors not only include these factors, but also include other factors not listed explicitly, or further comprise include intrinsic for such processes, methods, articles or devices. In the absence of more limitations, the factors limited by "comprising a . . . " do not exclude that additional identical factors are also included in the processes, methods, articles or devices comprising said factors.

The sequence number in the above embodiments of the present disclosure is only for the purpose of explanation and not intended to indicate the merits of the embodiments.

Through above description of the embodiments, it should be understood by a person skilled in the art that the present disclosure may be implemented by means of software in connection with necessary universal hardware platform. Of course, the present disclosure may also be implemented by a hardware. However, in many cases the former is more preferred. Based on this understanding, all or the part contributing to the prior art of the technical solution of the present disclosure may be embodied in the form of software. The computer software may be stored in a storage medium (such as ROM/RAM, diskette, or light disk) and include a plurality of instructions which are used to implement the method as described in the various embodiments of the present disclosure by a terminal device (such as a television, a mobile phone, a computer, a device, an air conditioner, or a network device, etc.).

The foregoing description merely portrays some illustrative embodiments according to the disclosure and therefore is not intended to limit the patentable scope of the disclosure. Any equivalent structural or flow transformations that are made taking advantage of the specification and accompanying drawings of the disclosure and any direct or indirect applications thereof in other related technical fields shall all fall in the scope of protection of the disclosure.

We claim:

1. An image super-resolution method, wherein the method comprises:

acquiring and amplifying an image to be processed, and extracting a scaling feature from the amplified image, to obtain a first image to be processed;

sending the first image to be processed to a residual network, for the residual network outputting a corrected second image to be processed; and restoring the second image to be processed to generate a restored image, and outputting the restored image, wherein the operation of acquiring and amplifying an image to be processed, and extracting a scaling feature from the amplified image, to obtain a first image to be processed, comprises:

acquiring a low-resolution image to be processed, and pre-processing the image to be processed in a pre-processing convolution layer; and sending the pre-processed image to be processed to a scale amplification module, amplifying the image to be processed based on a preset amplification scale, and extracting the scaling feature from the amplified image, to obtain the first image to be processed, and the preset amplification scale is defined as two times, three times, or four times.

2. The method according to claim 1, wherein the operation of sending the first image to be processed to a residual network, for the residual network outputting a corrected second image to be processed, comprises:
sending the first image to be processed to the residual network, processing the first image to be processed by a plurality of bottleneck residual units in the residual network, to generate the corrected second image to be processed; and
sending the second image to be processed to a scale restoring module.

3. The method according to claim 2, wherein the residual network comprises the plurality of bottleneck residual units and a convolution layer, and each bottleneck residual unit is connected with a weight normalization module.

4. The method according to claim 3, wherein the bottleneck residual unit comprises three convolution layers, and an activation function layer is defined between each two adjacent convolution layers, and the activation function is a Parametric Rectified Linear Unit function.

5. The method according to claim 4, wherein the activation function comprises a variable, and the value of the variable is obtained through learning from an upper network layer.

6. The method according to claim 1, wherein the operation of restoring the second image to be processed to generate a restored image, and outputting the restored image, comprises:
on condition that a scale restoring module receives the second image to be processed, reducing the scale of the second image to be processed based on a scale in a scale amplification module, to generate the restored image; and
outputting the restored image.

7. The method according to claim 1, wherein the operation of sending the first image to be processed to a residual network, for the residual network outputting a corrected second image to be processed, comprises:
sending the first image to be processed to the residual network, processing the first image to be processed by a plurality of bottleneck residual units in the residual network, to generate the corrected second image to be processed; and
sending the second image to be processed to a scale restoring module.

8. An image super-resolution device, wherein the device comprises: a memory, a processor, and an image super-resolution program stored on the memory and executable on the processor, the program, when executed by the processor, implements the following operations:
acquiring and amplifying an image to be processed, and extracting a scaling feature from the amplified image, to obtain a first image to be processed;
sending the first image to be processed to a residual network, for the residual network outputting a corrected second image to be processed; and
restoring the second image to be processed to generate a restored image, and outputting the restored image, wherein
the operation of acquiring and amplifying an image to be processed, and extracting a scaling feature from the amplified image, to obtain a first image to be processed, comprises:
acquiring a low-resolution image to be processed, and pre-processing the image to be processed in a pre-processing convolution layer; and
sending the pre-processed image to be processed to a scale amplification module, amplifying the image to be processed based on a preset amplification scale, and extracting the scaling feature from the amplified image, to obtain the first image to be processed, and
the preset amplification scale is defined as two times, three times, or four times.

9. The device according to claim 8, wherein the program, when executed by the processor, implements the following operations:
sending the first image to be processed to the residual network, processing the first image to be processed by a plurality of bottleneck residual units in the residual network, to generate the corrected second image to be processed; and
sending the second image to be processed to a scale restoring module.

10. A non-transitory computer readable storage medium, wherein an image super-resolution program is stored on the non-transitory computer readable storage medium, the program, when executed by a processor, implements the following operations:
acquiring and amplifying an image to be processed, and extracting a scaling feature from the amplified image, to obtain a first image to be processed;
sending the first image to be processed to a residual network, for the residual network outputting a corrected second image to be processed; and
restoring the second image to be processed to generate a restored image, and outputting the restored image, wherein
the operation of acquiring and amplifying an image to be processed, and extracting a scaling feature from the amplified image, to obtain a first image to be processed, comprises:
acquiring a low-resolution image to be processed, and pre-processing the image to be processed in a pre-processing convolution layer; and
sending the pre-processed image to be processed to a scale amplification module, amplifying the image to be processed based on a preset amplification scale, and extracting the scaling feature from the amplified image, to obtain the first image to be processed, and
the preset amplification scale is defined as two times, three times, or four times.

11. The non-transitory computer readable storage medium according to claim 10, wherein the program, when executed by the processor, implements the following operations:
sending the first image to be processed to the residual network, processing the first image to be processed by a plurality of bottleneck residual units in the residual network, to generate the corrected second image to be processed; and
sending the second image to be processed to a scale restoring module.

* * * * *